(No Model.)
W. S. JOHNSON.
ELECTRIC METER.
No. 286,445. Patented Oct. 9, 1883.
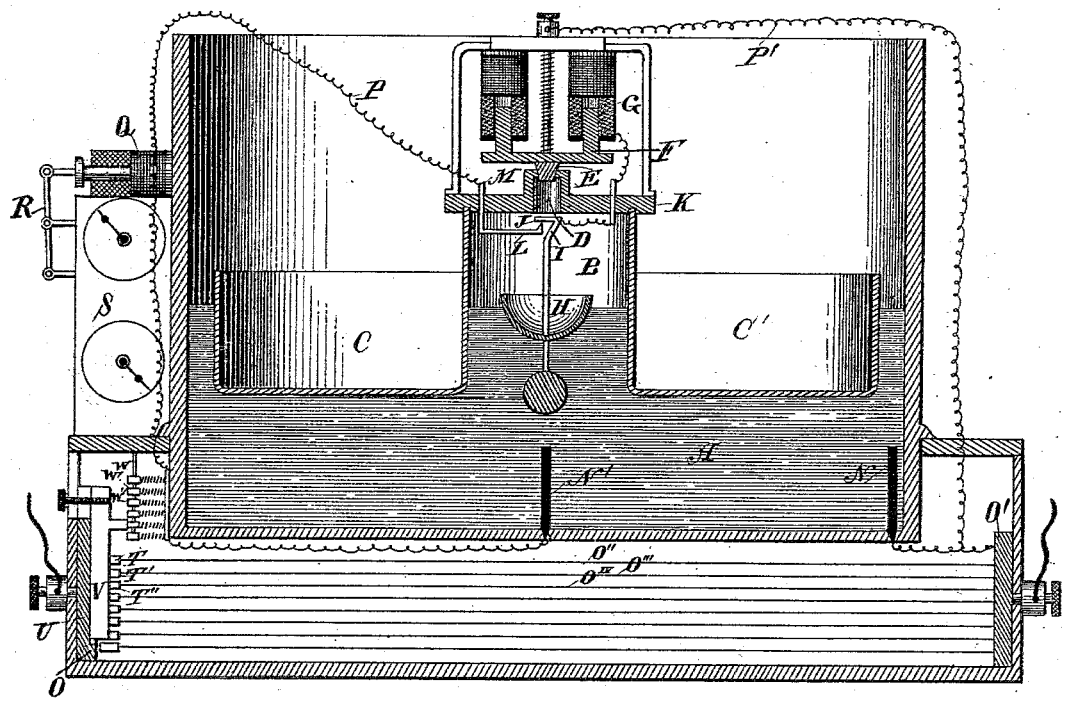

UNITED STATES PATENT OFFICE.

WARREN S. JOHNSON, OF WHITEWATER, ASSIGNOR OF ONE-HALF TO WILLIAM PLANKINTON, OF MILWAUKEE, WISCONSIN.

ELECTRIC METER.

SPECIFICATION forming part of Letters Patent No. 286,445, dated October 9, 1883.

Application filed February 21, 1883. (No model.)

*To all whom it may concern:*

Be it known that I, WARREN S. JOHNSON, of Whitewater, in the county of Walworth, and in the State of Wisconsin, have invented certain new and useful Improvements in Electric Meters; and I do hereby declare that the following is a full, clear, and exact description thereof.

My invention belongs to a class well-known as "voltameters," "webermeters," or "electric meters," and is designed to measure the quantity of electricity passing through a conductor in a given time, or to measure the entire quantity passed through without reference to time.

In the accompanying drawing, A is a tank containing an electrolytic solution, in which is a floating gas-reservoir, B, having an annular cup-shaped wing, C C', from which it gets its buoyancy. The bottom of the reservoir is closed by the electrolytic solution, while its top is closed by a cover, K, having a gas-outlet, D, in which fits a valve, E, that extends down from the armature F of an electro-magnet, G.

H is a saucer like float, that is balanced in the reservoir B by a depending weight, and is connected by a stirrup, I, with a platinum-disk, J, and the disk is connected with magnet G by a wire which passes through the cover K.

L is a wire one end of which is passed through the disk or cover K, above which it projects to receive the wire P at point M, and the other end extends out on a horizontal line and terminates in a platinum point just beneath the disk J.

N N' are electrodes that project up through the tank A into the electrolytic solution, and these electrodes, with the solution, form the continuation of one wire of a multiple-arc circuit, O O', of which wires O'' O''' O$^{IV}$, &c., are also a part. The electrolytic solution (say, acidulated water $HSO_4 + Aq$) furnishes by decomposition gases, which, rising into the reservoir B, drives out the solution in reservoir B, in which the float H rests, until the disk J makes contact with the point of wire L, and this completes a circuit from the multiple-arc circuit O O' through wire P', electro-magnet G, and wire P to electro-magnet Q, causing the armature of the latter to operate a lever, R, and recorder S, while at the same time the magnet G lifts its armature F, and with it the valve E, to permit a sufficient quantity of the gas in reservoir B to escape to allow the water in reservoir B to rise and break contact between disk J and wire L, and the parts remain in this position until a sufficient quantity of gas has accumulated to repeat the operation.

I will now describe my device for preventing the electrolytic solution in tank A from freezing.

The wires at one end of the multiple-arc circuit are provided with contact-plates T T' T'', &c., and they are connected with a general contact-plate, U, of the binding-post at that end by a sliding plate, V, and above them I arrange a number of resistance-coils, W W' W'', &c., also having each a contact-plate in such a position that an arm of the sliding plate V may be made to touch either one of them, so that when the slide Y is moved up sufficiently to clear the lowest of the wires in the multiple-arc circuit the rest of the wires will have more work to do, and heat will be developed by the resistance thus obtained, and this can be increased by throwing out more wires until those remaining would melt.

It is essential to the correct working of my device that the current passing from one electrode, N, to the other, N', shall not exceed its calculated proportion of the whole current to be measured, and therefore the resistance-coils W W are provided, and as they increase in resisting-power from the bottom up whenever one of the wires of the circuit O is cut out by the upward sliding of plate V the resistance in the wires of the electrodes is proportionably increased.

Having thus described my invention, what I claim as new, and desire to secure by Letters Patent, is—

1. The combination, with an electric meter containing an electrolytic fluid, of a multiple-arc circuit in radiating proximity thereto, and a cut-out, whereby the number of wires in the circuit may be reduced to give an increased and heating current through the remaining wires for keeping the temperature of the electrolytic fluid above the freezing-point, as set forth.

2. The combination, with an electric meter containing an electrolytic fluid, of a multiple-arc circuit, one branch of which is formed by said fluid, and a cut-out, and resistance-coils, as set forth.

3. In electric meters, the combination of a receptacle containing an electrolytic solution, a gas-reservoir, and a float located in the solution, with a valve actuated by the float to permit the escape of gas formed by the decomposition of the electrolytic solution, and a register electrically connected to the same for recording its action, as set forth.

In testimony that I claim the foregoing I have hereunto set my hand on this 5th day of February, 1883, in the presence of two witnesses.

WARREN S. JOHNSON.

Witnesses:
WM. PLANKINTON,
S. S. STOUT.